UNITED STATES PATENT OFFICE.

RICARDO GARZA, OF SAN ANTONIO, TEXAS.

COMPOSITION FOR SEALING TIRE-PUNCTURES AND THE LIKE.

1,247,814.  Specification of Letters Patent.  Patented Nov. 27, 1917.

No Drawing.   Application filed March 12, 1917.   Serial No. 154,350.

*To all whom it may concern:*

Be it known that I, RICARDO GARZA, a citizen of the Republic of Mexico, residing at San Antonio, in the county of Bexar and State of Texas, have invented a certain new and useful Composition for Sealing Tire-Punctures and the like, of which the following is a specification.

In producing my improved composition it has been my aim to utilize ingredients which will be relatively cheap and which in their combined form will produce a substance that will effectively seal punctures of inner tubes or other rubber articles.

It is my further aim to produce a composition of the type named which can be utilized to effectively seal a puncture of an inner tube while the associated tire is in use; which will not decompose, which will not rot the surrounding rubber; and which will not cause the inner tube to adhere to the outer case of the tire.

In producing my composition I first take one pound of the guayule plant and one quarter pound of the candelilla plant and boil them in sixteen pounds of distilled water to produce an extract containing the juices or latex of these plants. I then filter the resulting mixture and to the filtrate I add three pounds of fullers' earth and six ounces of well ground asbestos. The resulting mass is then stirred thoroughly until the composition is in the proper shape for use.

Preferably I boil the guayule plant and the candelilla plant until the resulting mixture is almost of the consistency of crude rubber but considerable variation is possible in this boiling operation without affecting the efficiency of my composition.

Experiment has shown that the use of the juice or latex of the guayule plant serves to prevent rotting of surrounding rubber, while the employment of the juice or latex of the candelilla plant will prevent the final composition from adhering to the outer case of the tire and in this way adhesion of the inner tube to the tire case is prevented.

In the use of the composition I pour a desired quantity in the inner tube of the tire where it remains until a puncture occurs, when it will ooze through the puncture, solidify therein, and thus efficiently seal the tube against the escape of air.

What is claimed is:—

1. A composition for sealing tire punctures consisting of the extract obtained from boiling guayule and candelilla plants in water to which is added asbestos and fullers' earth.

2. A composition for sealing tire punctures consisting of the extract obtained from boiling one pound of grayule plant and one quarter pound of candelilla plant in sixteen pounds of distilled water, to which extract is added, six ounces of well ground asbestos and three pounds of fullers' earth.

RICARDO GARZA.

Witnesses:
Jos. WEIL,
J. M. E. GARZA.

Copies of this patent may be obtained for five cents each, by addressing the "Commissioner of Patents, Washington, D. C."